United States Patent
Mori (10) Patent No.: US 6,385,845 B2
(45) Date of Patent: May 14, 2002

(54) WIRING STRUCTURE AND METHOD FOR WIRING ELECTRICAL WIRE ON BASE MEMBER

(75) Inventor: Toshiyuki Mori, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/788,517

(22) Filed: Feb. 21, 2001

Related U.S. Application Data (62) Division of application No. 09/288,662, filed on Apr. 9, 1999.

(30) Foreign Application Priority Data

Apr. 24, 1998 (JP) .......................................... P10-115623

(51) Int. Cl.⁷ .............................................. H01R 43/00
(52) U.S. Cl. .............................. 29/857; 29/843; 29/850; 29/863
(58) Field of Search ........................ 29/857, 850, 843, 29/863, 865, 866

(56) References Cited

U.S. PATENT DOCUMENTS

| | | | |
|---|---|---|---|
| 3,206,716 A | | 9/1965 | Spera |
| 3,366,914 A | | 1/1968 | McManus et al. |
| 3,643,133 A | | 2/1972 | Towell |
| 3,836,415 A | | 9/1974 | Hilderbrandt |
| 4,387,509 A | * | 6/1983 | Dechelette |
| 5,950,968 A | | 9/1999 | Sato |
| 5,952,616 A | | 9/1999 | Morrow |
| 6,137,054 A | * | 10/2000 | Uezono et al. ............... 29/843 |

FOREIGN PATENT DOCUMENTS

RU 657680 * 4/1979

* cited by examiner

*Primary Examiner*—Carl J. Arbes
(74) *Attorney, Agent, or Firm*—Finnegan, Henderson, Farabow, Garrett, & Dunner, L.L.P.

(57) ABSTRACT

A wiring method for an electrical wire 3 is provided. In the resultant wiring structure, an insulating base member 11 is provided with a plurality of projections 12 formed along a designated wiring route. Each projection 12 is provided with a dented top for receiving the wire 3. By using an ultrasonic welding machine, the wire 3 is welded on the projections 12 in order, while wiring the wire 3 on the insulating base member 11. The insulating base member 11 has a plurality of shelf portions providing a three-dimensional structure.

15 Claims, 7 Drawing Sheets

WIRING STRUCTURE AND METHOD FOR WIRING ELECTRICAL WIRE ON BASE MEMBER

This is a division of application Ser. No 09/288,662, filed on Apr. 9, 1999, which is currently pending, which claims priority to Japanese application Serial No. P 10-115623, filed Apr. 24, 1998, all of which are incorporated herein by reference.

BACKGROUND OF THE INVENTION

1. Field of the Invention

The present invention relates to a wiring structure where an electrical wire is wired and fixed on an insulating base member and a wiring method of producing such a wiring structure. More particularly, it relates to a wiring structure which will be appropriate for wiring a wire harness about a door trim for an automobile, the rear lamp, or the like.

2. Description of the Related Art

An ordinary wiring structure is disclosed in Japanese Unexamined Utility Model Publication (kokai) No. 5-46608. In this wiring structure, an insulating base member is disposed inside a door trim of an automobile. On a top surface of the base member, a plurality of slits are formed so as to extend along wiring routes designated for electrical wires. In wiring, the electrical wires are embedded into the slits of the base member, respectively. In this way, the electrical wires are arranged on the base member.

Similarly to the above wiring structure, Japanese Unexamined Utility Model Publication Nos. 7-20030 and 55-155022 disclose another wiring structure where the wires are fixed on the base member through the intermediary of fixtures different from the base member, for example clamps.

In the former conventional wiring structure, however, it is necessary to form many slits on the base member along each wiring route. Thus, when many wiring routes are required for the base member, then a problem arises in terms of the wiring workability. Especially, when it is required to lay the electrical wires on the so-called "three-dimensional" complicated base member, the wiring operation is too complicated to accomplish such a wiring operation on the manufacturing line for products.

On the other hand, in the latter structure where the wires are fixed on the base member by the fixtures, there is still remained a difficulty to fix the wires on the base member securely, thereby causing the unstable fixation of the wires. Additionally, due to a great number of fixtures to be handled, the wiring workability is deteriorated accordingly.

SUMMARY OF THE INVENTION

Under such a circumstance, it is therefore an object of the present invention to provide a wiring structure for an electrical wire and a wiring method of producing the wiring structure, by which it is possible to arrange the electrical wire on an insulating base member easily and certainly and also possible to facilitate the wiring of electrical wire against such a three-dimensional base member as mentioned above.

The object of the present invention described above can be accomplished by a wiring structure comprising:
an insulating base member made of an insulating material;
a plurality of projections formed integrally with the insulating base member so as to project at respective positions designated on the insulating base member; and
an electrical wire laid on the projections so that the electrical wire can be welded to the projections.

With the wiring structure mentioned above, when successively welding the electrical wire to the projections of the insulating base member, the electrical wire is secured on the insulating base member through the projections. In other words, owing to the provision of the projections on the base member, the electrical wire can be easily fixed on the insulating base member without forming any conventional slit on the insulating base member. In addition, since the wire is certainly fixed on the insulating base member through the projections formed integrally with the member, there is no need to prepare the conventional clamp etc. in order to fix the wire on the insulating base member.

In the present invention, preferably, the insulating base member is formed to have a three-dimensional structure of a designated profile and each of the projections is provided, on a top thereof, with a dint for receiving the electrical wire therein.

In this case, since the wire is retained in the respective dented tops of the projections, it is possible to easily and surely fix the electrical wire on the insulating base member even granting that it has a complicated "three-dimensional" structure.

In the present invention, more preferably, the projections are positioned along a wiring route to be designated on the insulating base member. In this case, it is possible to lay the electrical wire along the predetermined wiring route.

In the present invention, more preferably, the insulating member has a bore formed on the wiring route, for dividing the electrical wire into a plurality of wire portions. In this case, owing to the provision of the bore, it is possible to define a plurality of wiring routes consisting of the wire portions, on the insulating base member.

In the present invention, more preferably, the insulating member is provided, in the bore, with a plurality of notches for engagement with a lamp holder for an automobile. In this case, it is possible to support the lamp holder by the bore of the insulating base member.

According to the present invention, there is also provided a method of producing the above wiring structure, the method comprising the steps of:
integral-molding an insulating base member provided with a plurality of projections at designated positions on the insulating base member;
preparing an electrical wire;
successively welding the electrical wire onto the projections of the insulating base member while laying the electrical wire on the projections. In the above-mentioned method, since the wiring is carried out while holding the wire by the projections, the workability in wiring can be improved, thereby allowing the automatic wiring of the electrical wire. In the integral-molding step, preferably, the insulating base member is formed to have a three-dimensional structure of a designated profile by a vacuum molding method. In this case, it is possible to wire the electrical wire on the insulating base member having the complicated "three-dimensional" structure. That is, the accurately-wired product can be produced at a low cost.

In the above-mentioned method, preferably, the projections are positioned along a wiring route to be designated on the insulating base member. Also in this case, it is possible to lay the electrical wire along the predetermined wiring route.

In the above-mentioned method, more preferably, it further comprises the step of punching the insulating base member having the electrical wire welded on the projections, thereby to form a bore positioned on the wiring route, for dividing the electrical wire into a plurality of wire portions. In this case, owing to the provision of the bore, it is possible to define a plurality of wiring routes consisting of the wire portions, on the insulating base member.

In the above-mentioned method, it is preferable that the welding step is carried by using an ultrasonic welding machine. In this case, the welding operation for the wire can be simplified due to the facility of ultrasonic welding.

These and other objects and features of the present invention will become more fully apparent from the following description and appended claims taken in conjunction with the accompany drawings.

DESCRIPTION OF THE PREFERRED EMBODIMENT

Embodiments of the present invention will be described hereinafter, with reference to the accompanying drawings.

Figure 1A:
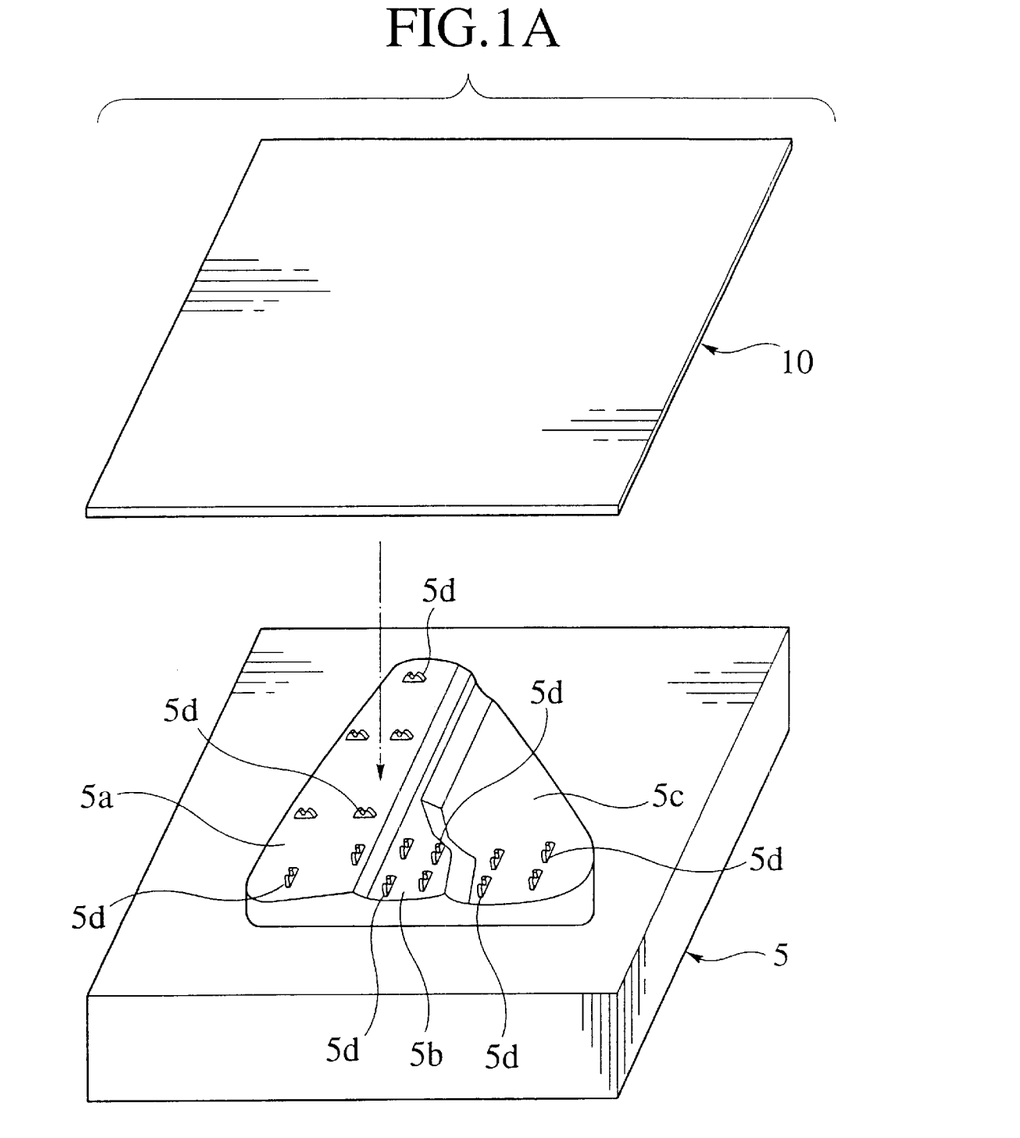
FIG. 1A is a perspective view of both vacuum molding die and resinous member, which are used together in accordance with the wiring method of the embodiment of the present invention
Figure 1B:
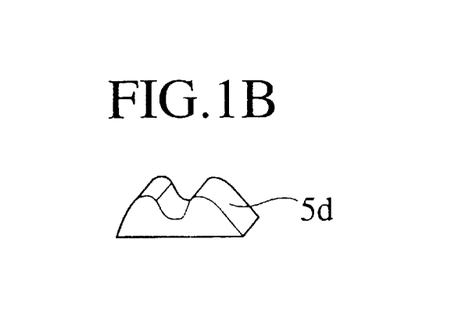
FIG. 1B is an enlarged perspective view of an essential part of the vacuum molding die.

FIGS. 1A to 6 show respective steps of wiring an electrical wire in due order, in accordance with the embodiment of the present invention. According to the embodiment, a resinous material 10 in the form of a rectangular plate is firstly prepared and subsequently molded into a base member 11 on which the electrical wire 3 has to be wired, by the vacuum molding technique using a molding die 5 shown in FIG. 1A. Note, although a covered wire is representative of the electrical wire 3 in the shown embodiment, it may be replaced with a bare wire, an enamel wire, or the like. The molding die 5 is provided, in a center thereof, with a projection which protrudes from the upper face. The projection is constituted by three molding faces 5a, 5b and 5c forming two steps on the upper face. Along some wiring routes designated on the molding faces 5a, 5b and 5c, a plurality of dented ribs 5d are formed integrally with the molding die 5, as shown in FIGS. 1A and 1B.

Figure 4A:
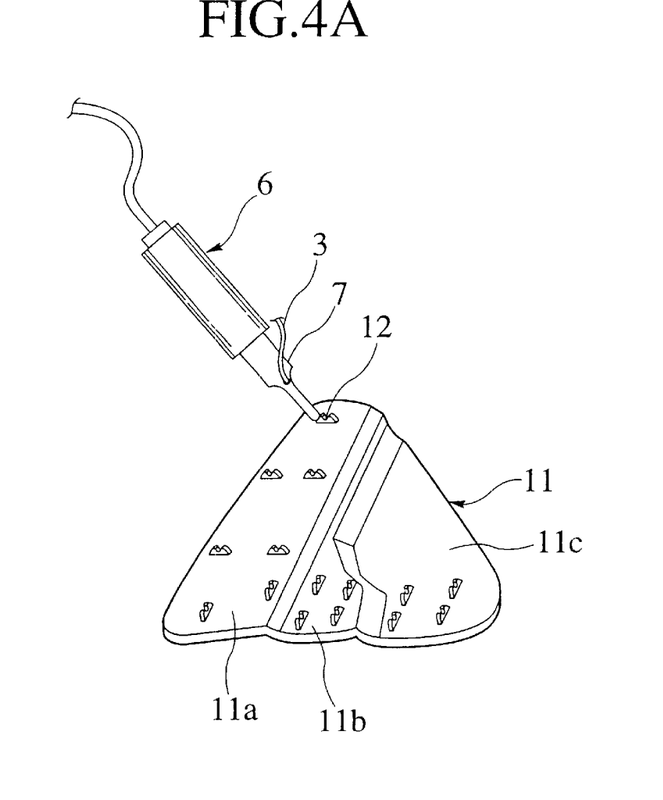
FIG. 4A is a perspective view showing a condition where an electrical wire is being attached on the initial projection on the insulating base member at the beginning of wiring and FIG. 4B is an enlarged perspective view of an essential part of a wiring machine used in wiring the electrical wire.
Figure 4B:
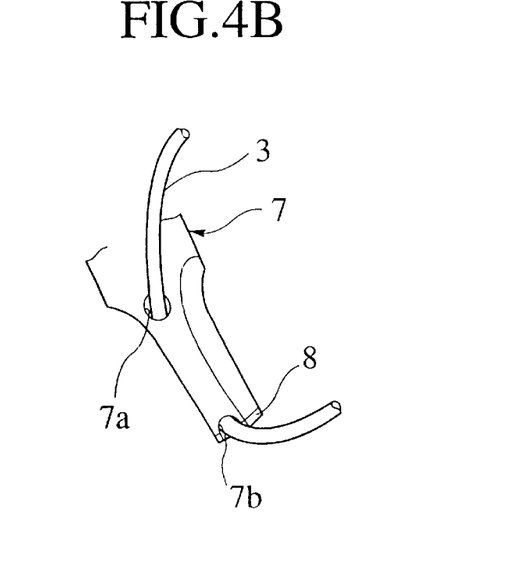
Figure 5A:
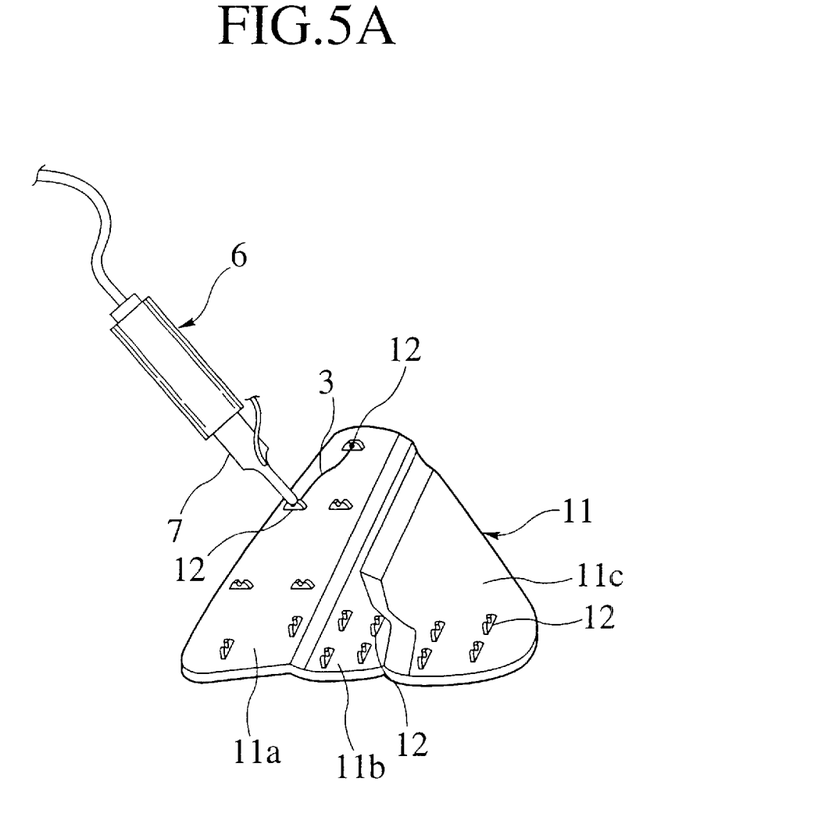
FIG. 5A is a perspective view showing a condition where the electrical wire is being successively arranged on the next projection adjacent to the initial projection and FIG. 5B is an enlarged perspective view showing a condition where the electrical wire is welded to the projection, including the partial cross section of the wire.

In order to weld the wire 3 on the insulating base member 11, a wiring machine 6 as shown in FIGS. 4A, 4B and 5A is employed. The wring machine 6 operates to continuously withdraw the electrical wire 3 from a not-shown wire roll and serves to dispose the wire 3 on the base member 11. Additionally, the shown wiring machine 6 also serves as an ultrasonic welding machine. In this point of view, the machine 6 is equipped with a wire holding cylinder 7 having an ultrasonic horn 8 on the tip, for the ultrasonic oscillation. Moreover, the wire holding cylinder 7 is provided, on upper and lower portions thereof, with wire through-holes 7a, 7b, respectively. Owing to the above-mentioned structure of the machine 6, it allows the wire 3 to be disposed on the base member 11 while being tensed.

With reference to FIGS. 1A to 6, we now describe the wiring steps for the wire 3 in accordance with the embodiment, in detail.

Figure 2:
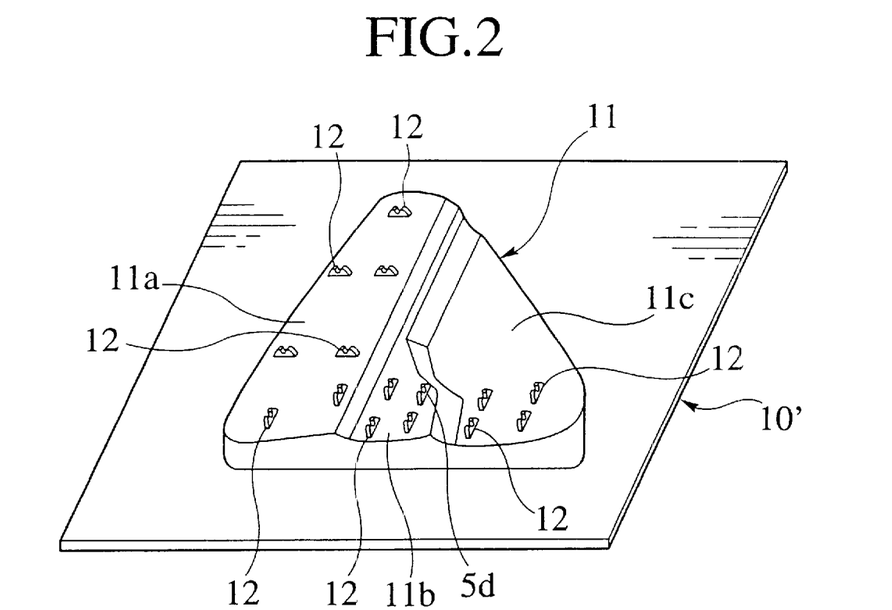
FIG. 2 is a perspective view of a vacuum molding product molded by the vacuum molding die.
Figure 3A:
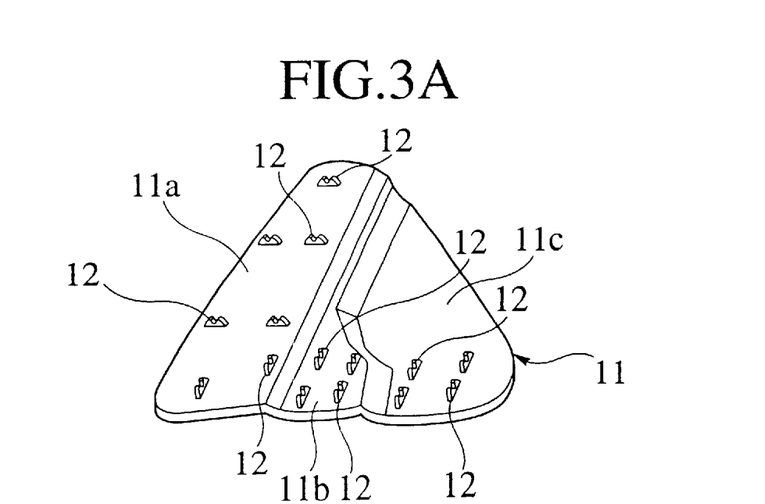
FIG. 3A is a perspective view of a base member obtained from the vacuum molding product.

As shown in FIGS. 1A and 2, by deforming the resinous insulating material 10 in the form of a rectangular plate by the vacuum-molding technique using the molding die 5, a provisional "vacuum-molding" product 10' is provided to have the projecting base member 11 integrally formed at a center of the product 10'. Then, the provisional product 10' is subjected to either punching or cutting process to eliminate the superfluous periphery of the central projecting portion, so that the base member 11 can be provided to have a generally-triangle profile in plan view, as shown in FIG. 3A. The resultant base member 11 has a first shelf portion 11a in the form of a high bunk, a second shelf portion 11b in the form of a middle bunk and a third shelf portion 11c in the form of a low bunk, providing the so-called "three-dimensional structure" for the member 11. In other words, the base member 11 has three steps.

Figure 3B:
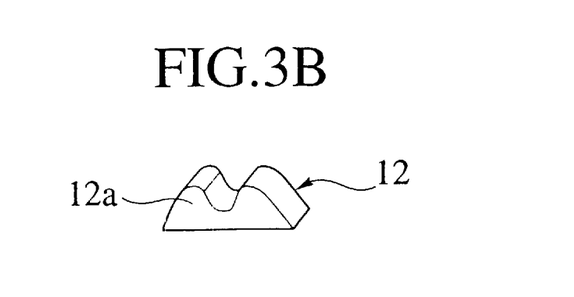
FIG. 3B is an enlarged perspective view of an essential part of the insulating base member.

Additionally, during the vacuum molding for the base member 11, a plurality of projections 12 each having a dented tip 12a are formed integrally with the member 11, for retaining the wire 3 along the wiring routes defined on the shelf portions 11a, 11b and 11c. As shown in FIG. 3B, owing to the provision of the dented tip 12a of each projection 12, the arranging of the wire 3 on the projections 12 allows the wire 3 to be temporarily fixed on the respective projections 12 of the base member 11 with ease, so that no positional deviation of the wire 3 from the wiring routes is produced at the time of wiring the same on the member 11.

Figure 5B:
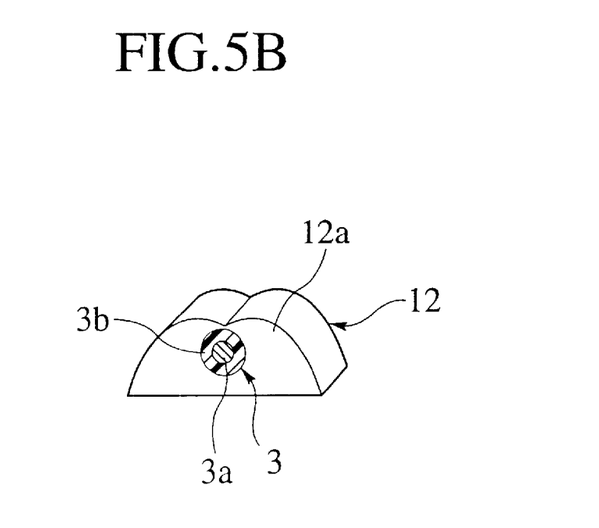

Next, as shown in FIG. 4A, the wiring machine 6 also serving as an ultrasonic welding machine is driven and finally stopped on the upside of the specified (initial) projection 12 as a starting point for wiring on the first shelf portion 11a of the base member 11, by a not-shown six-spindle robot. Subsequently, on the completion of disposing the electrical wire 3 on the tip 12a of the initial projection 12 through the lower through-hole 7b in the wire holding cylinder 7 projecting from the wiring machine 6, then the tip 12a of the projection 12 is oscillated with ultrasonic waves by the horn 8 at the tip of the wire holding cylinder 7 of the wiring machine 6. By the ultrasonic oscillation, as shown in FIG. 5B, the tip 12a of the projection 12 is molten to weld the wire 3 to the projection 12, so that the wire 3 is secured on the base member 11. Simultaneously, since an insulating cover 3b covering a core line 3a of the wire 3 is also fused together with the tip 12a of the projection 12, the wire 3 can be surely fixed on the base member 11.

Figure 6:
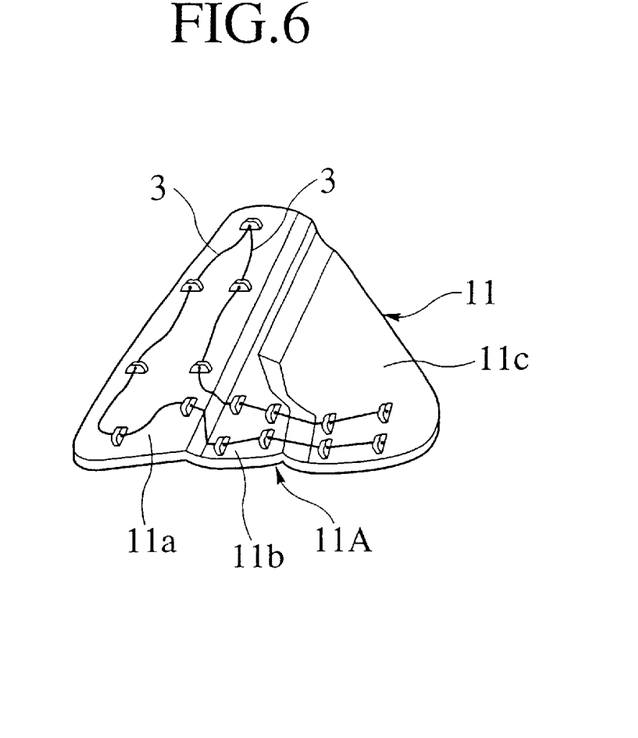
FIG. 6 is a perspective view showing a condition that the wiring of wire onto the insulating base member has been completed.

Next, as shown in FIG. 5A, the wire 3 is welded and secured to the second projection 12 on the shelf portion 11a of the base member 11 by means of the horn 8 while applying tension on the wire 3 by the wire through-holes 7a, 7b of the wire holding cylinder 7 of the wiring machine 6. On the completion of welding the wires 3 (of two wiring routes) to the projections 12 on the first shelf portion 11a of the base member 11 in the above way, the same operation is transferred to the projections 12 on the second shelf portion 11b and the sequent projections 12 on the third shelf portion 11c successively. The finished product 11A resulting from such wiring and welding is shown in FIG. 6.

Thus, by the adoption of such a wiring process for the wire 3, it is possible to smoothly arrange and fix the wire(s) 3 on the base member 11 in a short time even granting that it has such a complicated "three-dimensional" structure. Additionally, as there is no need to provide the aforementioned slits or the separate members, for example clamps in order to fix the wire(s) 3 on the base member 11, it is possible to produce the finished product 11A of extreme accuracy at a low cost.

Further, since the laying of the wire 3 is carried out under condition that it is held on the projections 12, it is possible to fix the wire 3 on the accurate position of the base member 11 through the projections 12 easily and certainly, whereby the workability in wiring can be improved furthermore.

Moreover, when the wiring machine 6 is controlled so as to freely move in the three-dimensional directions by means of the robot, then the automatic wiring of the wire 3 can be realized though the base member 11 is of the complicated "three-dimensional structure" while accompanying a likelihood of the rapid and "labor-saving" wiring.

Figure 7:
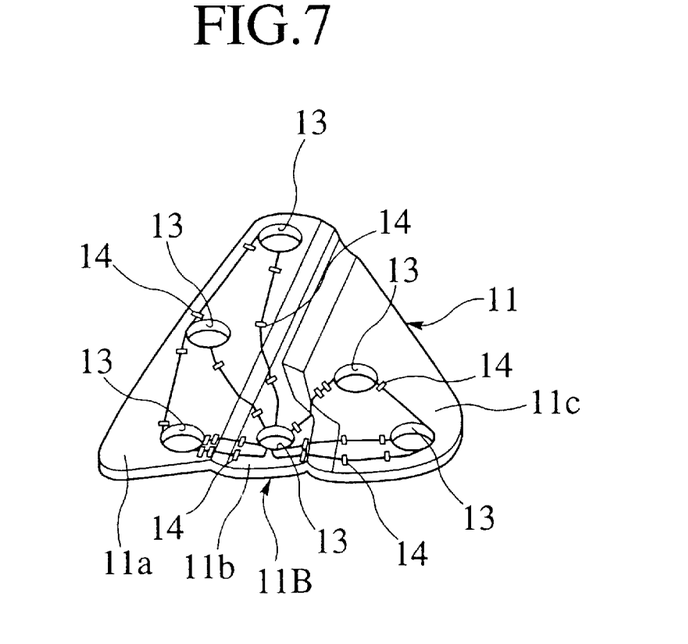
FIG. 7 is a perspective view of the applied base member obtained by punching the above base member having electrical wires wired completely.

FIG. 7 shows a modified product 11B which may be obtained by applying a further machining on the finished product 11A provided by the above-mentioned wiring method. At predetermined positions on the base member 11, the modified product 11B has a plurality of bores 13 formed by punching the member 11. These bores 13 are utilized for fixing the product 11B on a lamp holder 23 of a rear lamp 20 which will be mentioned later. Each of the bores 13 has a function to divide the wire 3 into plural wires, also. That is, since the single wire 3 is divided into some wire parts by providing the bores 13, it is possible to define more circuits on the base member 11.

In FIG. 7, it is noted that reference numerals 14 indicated by dots designate respective fixing points where the electrical wires 3 are fixed on the base member 11 through the molten projections 12. Although the base member 11 of FIG. 7 has the bores 13 punched at the predetermined positions, the member 11 may be provided with further grooves (not shown) so that the single wire 3 is divided into a plurality of wire parts by the bores 13 and the above grooves, in the modification.

Figure 8:
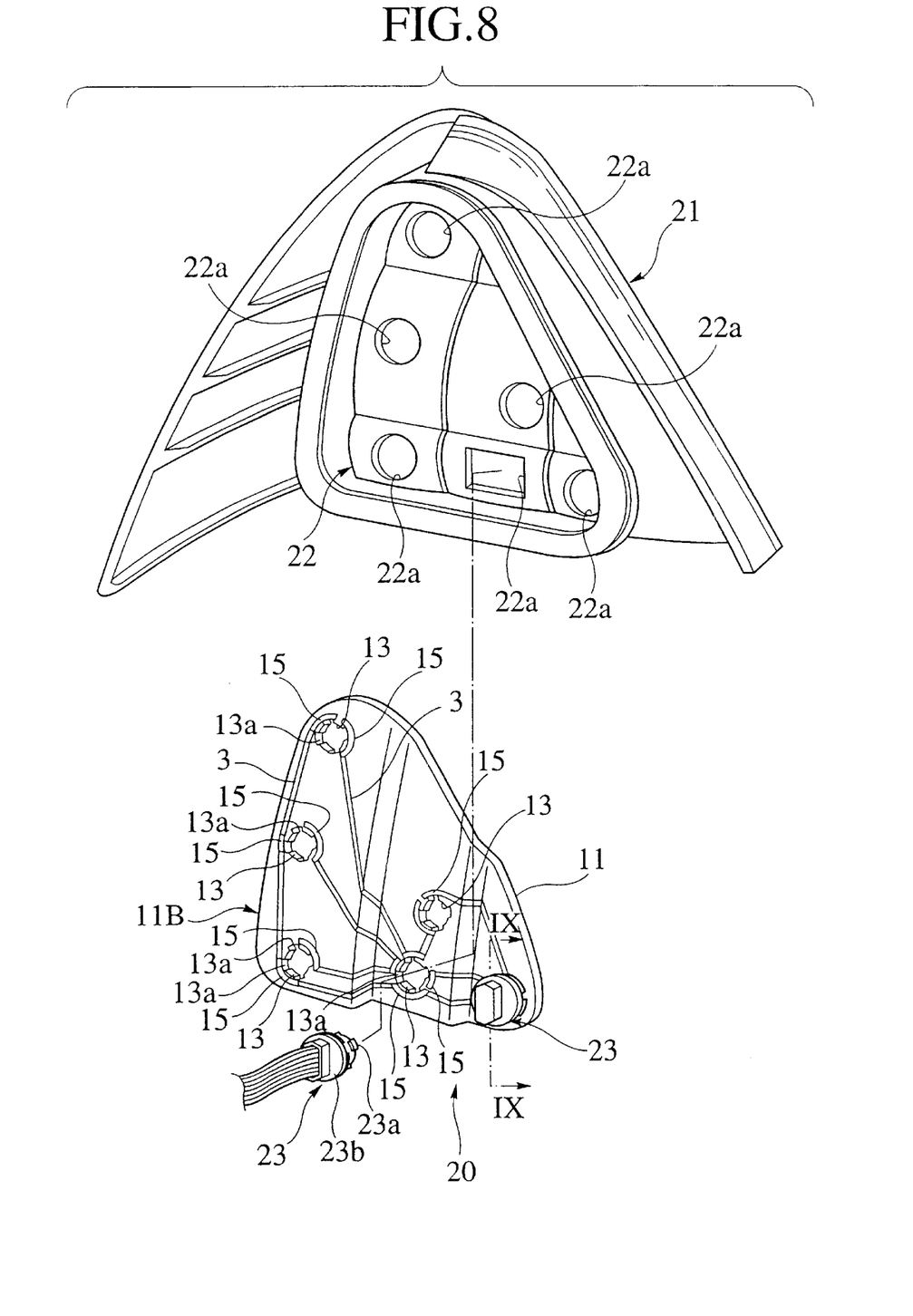
FIG. 8 is an exploded perspective view showing a structure where the above-mentioned base member is applied to a rear lamp of an automobile.

FIG. 8 shows an embodiment where the above modified product 11B is applied on the rear lamp 20 for the automobile. The rear lamp 20 comprises a transparent casing 21 in the form of a generally triangular corn, which is made of synthetic resin and provided with a red portion and two whitish parallel bands at the center of the red portion, a generally trapezoidal reflector 22 attached to the casing 21, the applied product 11B to be mounted on the reflector 22, and some detachable lamps 24 (only one shown in FIG. 9B) which are fitted in the bores 13 in the base member 11 of the product 11B through the intermediary of lamp holders 23.

Formed about the respective bores 13 of the base member 11 are patterns 15 to which the divided wires 3 are respectively connected. Again, each of the bores 13 is provided with four notches 13a for engagement and disengagement with the lamp holder 23. On the other hand, the lamp holder 23 has projecting claws 23a formed in opposition to the notches 13a, respectively. The reflector 22 has a plurality of openings 22a formed in respective positions opposing to the bores 13 in the base member 11.

Figure 9A:
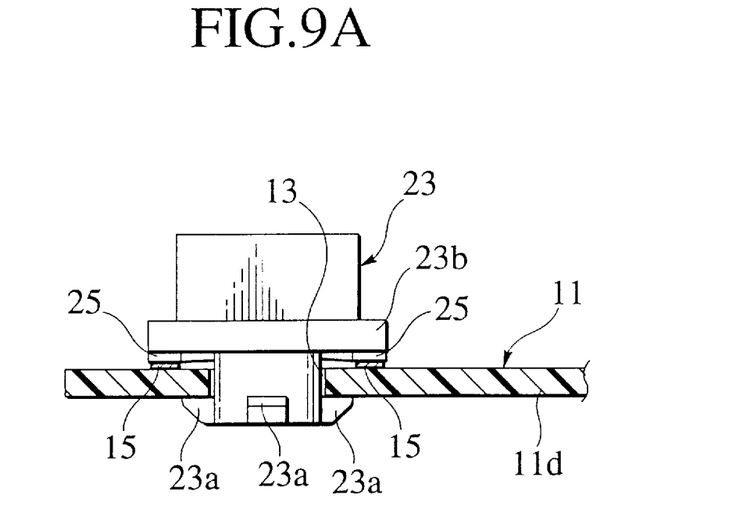
FIG. 9A is a cross sectional view of the structure, taken along a line IX—IX of FIG. 8
Figure 9B:
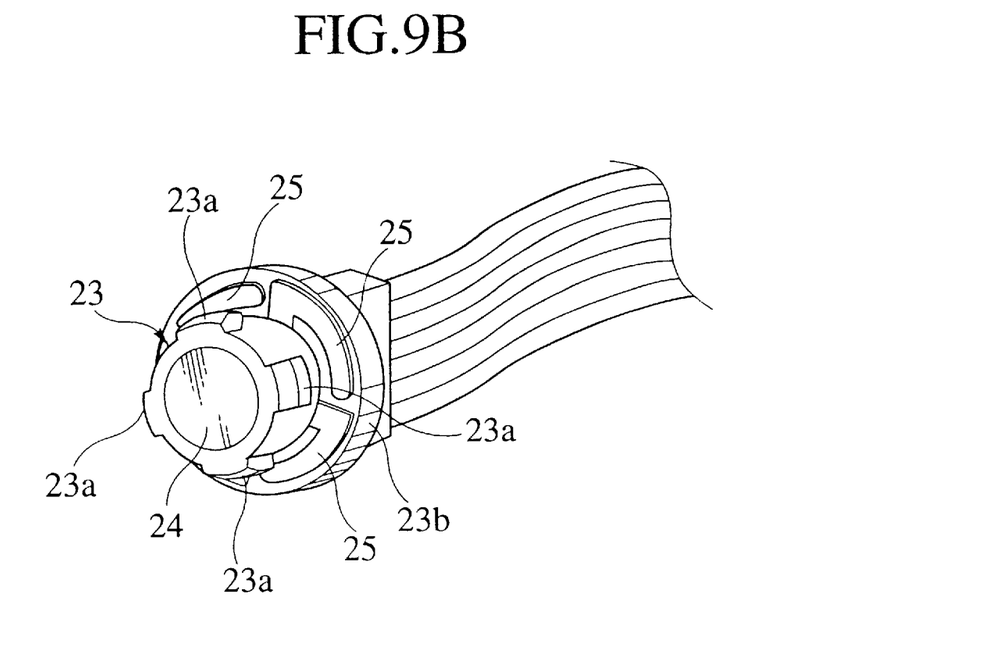
FIG. 9B is a perspective view of a lamp holder used in the above rear lamp, also viewed from the front side of the lamp holder.

With the above-mentioned structure, by inserting the claws 23a of the lamp holder 23 into the notches 13a of one bore 13 in the base member 11 and sequent rotating the lamp holder 23 for engaging the claws 23a with the member's back 11d about the bore 13, it is possible to provide a structure allowing the lamp 24 to be easily attached on the side of the reflector 22. Then, as shown in FIGS. 9A and 9B, terminals 25 protruding from a rim 23b of the lamp holder 23 are electrically connected to the patterns 15 about the bore 13.

In this way, owing to the use of the applied product 11B as a baseplate for the rear lamp 20, the wiring work of the rear lamp 20 can be simplified extremely. Additionally, with the work to only rotate the lamp holder 23 about the bore 13, it is possible to fit the lamp 24 in the lamp holder 23 with ease. Furthermore, since the base member 11 is attachable along the reflector 22 having a complicated structure, it is possible to provide a thin, small-sized and lightweight rear lamp 20.

In the above-mentioned embodiment, although the wiring structure of the invention is applied in connection with the rear lamp of the automobile, of course, the present invention is applicable to other instruments, such as a door trim of the vehicle.

Finally, it will be understood by those skilled in the art that the foregoing description is related to one preferred embodiment of the disclosed wiring structure and method, and that various changes and modifications may be made to the present invention without departing from the spirit and scope thereof.

What is claimed is:

1. A method of producing a wiring structure, the method comprising the steps of:
   molding an insulating base member having a plurality of integral projections at designated positions on the insulating base member;
   preparing an electrical wire;
   successively welding the electrical wire onto the projections of the insulating base member while laying the electrical wire on the projections.

2. A method as claimed in claim 1, wherein, in the molding step, the insulating base member is formed to have a three-dimensional structure of a designated profile by a vacuum molding method.

3. A method as claimed in claim 2, wherein the projections are positioned along a wiring route to be designated on the insulating base member.

4. A method as claimed in claim 3, further comprising the step of punching the insulating base member having the electrical wire welded on the projections, thereby to form a bore positioned on the wiring route, for dividing the electrical wire into a plurality of wire portions.

5. A method as claimed in claim 1, wherein the welding step is carried out by an ultrasonic welding machine.

6. A method of forming a wiring structure comprising:

molding an insulating base member having a plurality of integral projections at respective positions on the insulating base member;

placing an electrical wire into contact with the plurality of projections of the insulating base member; and welding the electrical wire to each of the projections as the wire is placed into contact with each of the projections.

7. The method according to claim 6, further comprising performing the placing of the electrical wire and welding of the electrical wire with a single machine.

8. The method according to claim 7, wherein placing the electrical wire includes feeding the electrical wire through the machine.

9. The method according to claim 6, wherein the electrical wire includes a cover, and welding of the electrical wire includes fusing the cover of the electrical wire and the projection together.

10. The method according to claim 6, wherein molding the insulating base member includes vacuum molding the insulating base member to provide a designated profile.

11. The method according to claim 6, further including defining a wiring route by the positions of the plurality of projections.

12. The method according to claim 4, further comprising punching the insulated base member to form a bore to divide the electrical wire into a plurality of wire portions.

13. The method according to claim 12, wherein the punching of the insulated bas member is performed after welding of the electrical wire to the projections.

14. The method according to claim 6, further includes performing the welding of the electrical wire with an ultrasonic welding machine.

15. The method according to claim 6, wherein molding the insulating base member includes forming the plurality of projections with dented tips, and placing the electrical wire into contact with the plurality of projections comprises placing the electrical wire in the dented tip of each of the plurality of projections.

* * * * *